United States Patent
Kozasa

(10) Patent No.: US 11,320,170 B2
(45) Date of Patent: May 3, 2022

(54) HEAT PUMP CYCLE

(71) Applicant: DENSO CORPORATION, Kariya (JP)

(72) Inventor: Tetsuo Kozasa, Kariya (JP)

(73) Assignee: DENSO CORPORATION, Kariya (JP)

(*) Notice: Subject to any disclaimer, the term of this patent is extended or adjusted under 35 U.S.C. 154(b) by 77 days.

(21) Appl. No.: 16/843,532

(22) Filed: Apr. 8, 2020

(65) Prior Publication Data

US 2020/0232673 A1 Jul. 23, 2020

Related U.S. Application Data

(63) Continuation of application No. PCT/JP2018/033342, filed on Sep. 10, 2018.

(30) Foreign Application Priority Data

Oct. 16, 2017 (JP) .............................. JP2017-200416

(51) Int. Cl.
 *F24F 12/00* (2006.01)
 *F24F 11/86* (2018.01)
 *F25B 30/02* (2006.01)

(52) U.S. Cl.
 CPC ............ *F24F 12/003* (2013.01); *F24F 11/86* (2018.01); *F25B 30/02* (2013.01); *F25B 2321/0252* (2013.01)

(58) Field of Classification Search
 CPC .............. F24F 11/86; F25B 2321/0252; F25B 27/02; B60H 1/22; B60H 1/32
 See application file for complete search history.

(56) References Cited

U.S. PATENT DOCUMENTS

| 5,878,589 A | * | 3/1999 | Tanaka ............... B60H 1/00007 |
| | | | 62/199 |
| 5,996,365 A | | 12/1999 | Tanaka |
| 6,347,528 B1 | | 2/2002 | Iritani et al. |

(Continued)

FOREIGN PATENT DOCUMENTS

| JP | S61-086540 A | 5/1986 |
| JP | S61-153458 A | 7/1986 |

(Continued)

OTHER PUBLICATIONS

Translation JP-2016048131 -A.*

*Primary Examiner* — Elizabeth J Martin
(74) *Attorney, Agent, or Firm* — Harness, Dickey & Pierce, P.L.C.

(57) ABSTRACT

A heat pump cycle includes a compressor, a heat exchanger, a gas-liquid separator, and an outdoor heat exchanger. The heat pump cycle includes a main circuit connecting the compressor, the heat exchanger, the gas-liquid separator, and the outdoor heat exchanger such that refrigerant flows therethrough. The heat pump cycle includes an exhaust-heat recovery heat exchanger, and an exhaust-heat recovery circuit forming a flow path leading to the compressor not through the outdoor heat exchanger but through the exhaust-heat recovery heat exchanger. The heat pump cycle includes an expansion valve that is disposed upstream of the exhaust-heat recovery heat exchanger in the exhaust-heat recovery circuit and expands the refrigerant such that the refrigerant changes from liquid phase to gas phase in the exhaust-heat recovery heat exchanger.

10 Claims, 7 Drawing Sheets

(56) References Cited

U.S. PATENT DOCUMENTS

| | | |
|---|---|---|
| 2004/0079096 A1 | 4/2004 | Itoh et al. |
| 2006/0080989 A1 | 4/2006 | Aoki et al. |
| 2012/0085512 A1* | 4/2012 | Graaf ............... B60L 58/26 165/51 |
| 2012/0227428 A1 | 9/2012 | Yokoo et al. |
| 2012/0266622 A1 | 10/2012 | Inaba et al. |
| 2013/0055746 A1 | 3/2013 | Yokoo et al. |
| 2013/0312447 A1 | 11/2013 | Inaba et al. |
| 2014/0238067 A1 | 8/2014 | Itou et al. |
| 2014/0290772 A1 | 10/2014 | Itou et al. |
| 2014/0318170 A1 | 10/2014 | Katoh et al. |
| 2015/0176868 A1 | 6/2015 | Kayano et al. |
| 2015/0300706 A1 | 10/2015 | Awa et al. |
| 2016/0201962 A1* | 7/2016 | Shin ............... F25B 27/02 62/115 |
| 2016/0236539 A1 | 8/2016 | Suzuki et al. |
| 2016/0297283 A1* | 10/2016 | Sakamoto ........ B60H 1/32281 |
| 2017/0219263 A1* | 8/2017 | Schmidt ............... F25B 49/00 |
| 2017/0284712 A1* | 10/2017 | Ugajin ............... F25B 9/006 |
| 2019/0232757 A1 | 8/2019 | Suzuki et al. |
| 2020/0103151 A1* | 4/2020 | Prins ............... F25B 5/02 |

FOREIGN PATENT DOCUMENTS

| | | |
|---|---|---|
| JP | H09-079667 A | 3/1997 |
| JP | H09-089389 A | 4/1997 |
| JP | H09-328013 A | 12/1997 |
| JP | 2002005532 A | 1/2002 |
| JP | 2002-081769 A | 3/2002 |
| JP | 2002295922 A | 10/2002 |
| JP | 2003254661 A | 9/2003 |
| JP | 2005134080 A | 5/2005 |
| JP | 2005147456 A | 6/2005 |
| JP | 2005214510 A | 8/2005 |
| JP | 3799748 B2 | 7/2006 |
| JP | 3841039 B2 | 11/2006 |
| JP | 2007051788 A | 3/2007 |
| JP | 2007178042 A | 7/2007 |
| JP | 2009079863 A | 4/2009 |
| JP | 2009270822 A | 11/2009 |
| JP | 2010048447 A | 3/2010 |
| JP | 2011208841 A | 10/2011 |
| JP | 2012181005 A | 9/2012 |
| JP | 2013139995 A | 7/2013 |
| JP | 2013203221 A | 10/2013 |
| JP | 5423528 B2 | 2/2014 |
| JP | 2014029237 A | 2/2014 |
| JP | 5488185 B2 | 5/2014 |
| JP | 5510367 B2 | 6/2014 |
| JP | 5510418 B2 | 6/2014 |
| JP | 5533207 B2 | 6/2014 |
| JP | 5556499 B2 | 7/2014 |
| JP | 2015045453 A | 3/2015 |
| JP | 2015074274 A | 4/2015 |
| JP | 2015116934 A | 6/2015 |
| JP | 2015128926 A | 7/2015 |
| JP | 2015137779 A | 7/2015 |
| JP | 5772764 B2 | 9/2015 |
| JP | 5821756 B2 | 11/2015 |
| JP | 2015191703 A | 11/2015 |
| JP | 2015218911 A | 12/2015 |
| JP | 2016048131 A * | 4/2016 |
| JP | 2016049915 A | 4/2016 |
| JP | 5920272 B2 | 5/2016 |
| JP | 2016132271 A | 7/2016 |
| JP | 5967022 B2 | 8/2016 |
| JP | 6011493 B2 | 10/2016 |
| JP | 6015636 B2 | 10/2016 |
| JP | 2016223705 A | 12/2016 |
| JP | 6079474 B2 | 2/2017 |
| JP | 6079475 B2 | 2/2017 |
| JP | 6094401 B2 | 3/2017 |
| JP | 6097234 B2 | 3/2017 |
| JP | 6119616 B2 | 4/2017 |
| WO | WO-2014010178 A1 | 1/2014 |
| WO | WO-2016104147 A1 | 6/2016 |

* cited by examiner ions of the comparative example, the gas-
HEAT PUMP CYCLE

CROSS REFERENCE TO RELATED APPLICATIONS

The present application is a continuation application of International Patent Application No. PCT/JP2018/033342 filed on Sep. 10, 2018, which designated the U.S. and claims the benefit of priority from Japanese Patent Application No. 2017-200416 filed on Oct. 16, 2017. The entire disclosures of all of the above applications are incorporated herein by reference.

TECHNICAL FIELD

The disclosure in this specification relates to a heat pump cycle.

BACKGROUND

A gas-injection heat pump cycle performs gas injection in which gas-phase refrigerant separated by a gas-liquid separator is introduced into an intermediate pressure port of a compressor, so that power consumption of the electric compressor is reduced.

SUMMARY

According to at least one embodiment, a heat pump cycle includes: a compressor that compresses refrigerant; a heat exchanger that exchanges heat between the refrigerant discharged from the compressor and indoor air; a gas-liquid separator that separates the refrigerant flowing out of the heat exchanger into gas phase and liquid phase; an outdoor heat exchanger that performs heat exchange between the refrigerant flowing out of the gas-liquid separator and outdoor air; a main circuit forming a flow path allowing the refrigerant to flow therethrough and connecting the compressor, the heat exchanger, the gas-liquid separator, and the outdoor heat exchanger; an exhaust-heat recovery heat exchanger that performs heat exchange between a heat source that releases heat and the refrigerant in liquid phase separated by the gas-liquid separator; an exhaust-heat recovery circuit forming a flow path in which the refrigerant in liquid phase flowing out of the gas-liquid separator flows to the compressor not through the outdoor heat exchanger but through the exhaust-heat recovery heat exchanger; and an expansion valve that is disposed upstream of the exhaust-heat recovery heat exchanger in the exhaust-heat recovery circuit and expands the refrigerant such that the refrigerant changes from liquid phase to gas phase in the exhaust-heat recovery heat exchanger.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
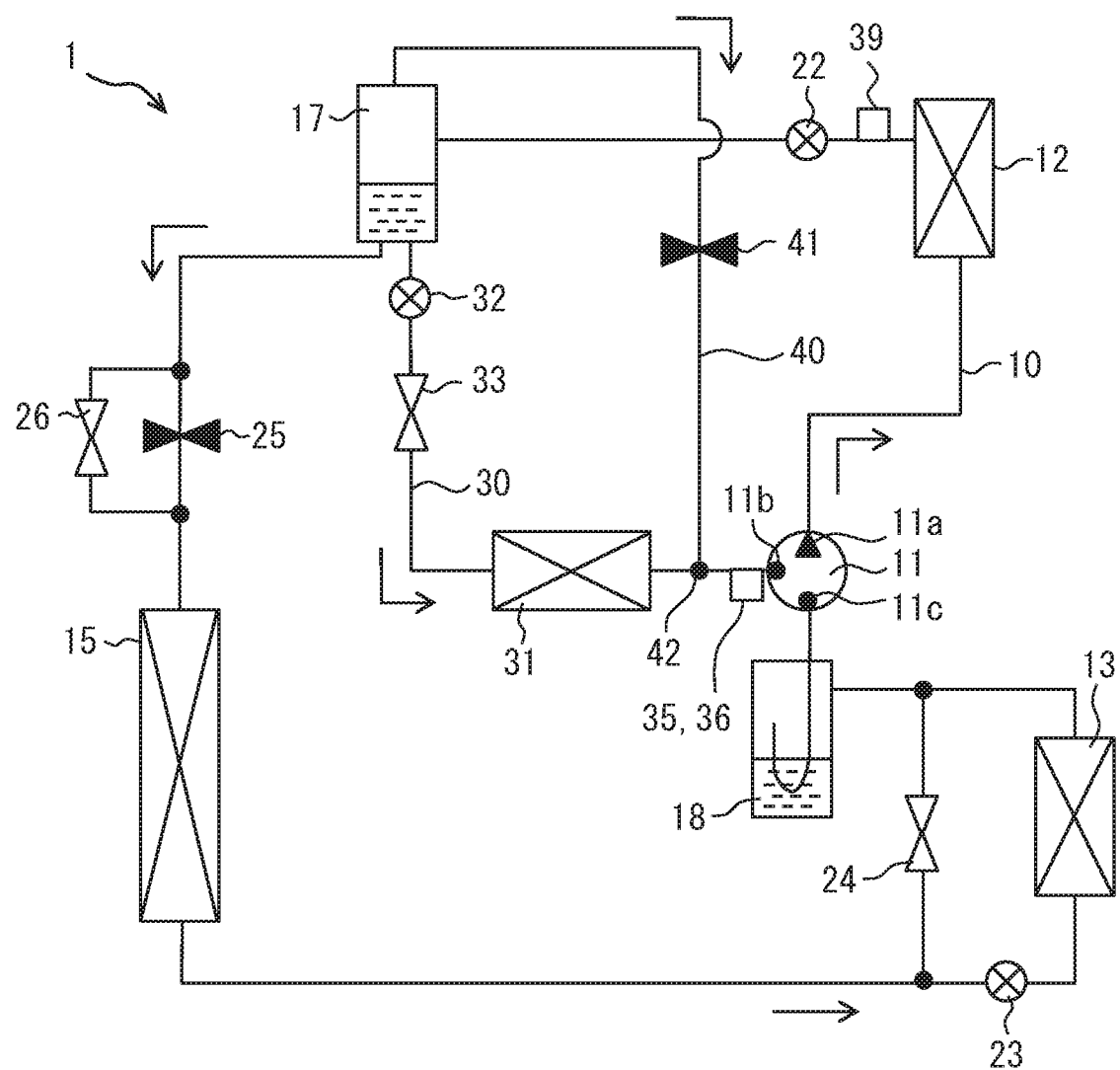
FIG. 1 is a diagram illustrating a configuration of a heat pump cycle according to at least one embodiment.

A comparative example will be described. A heat pump cycle of the comparative example performs gas injection in which gas-phase refrigerant separated by a gas-liquid separator is introduced into an intermediate pressure port of a compressor, so that power consumption of the electric compressor is reduced.

In the configuration of the comparative example, the gas-phase refrigerant separated by the gas-liquid separator is returned to the compressor. In this case, however, the gas-phase refrigerant that can be returned to the compressor is only the gas-phase refrigerant separated by the gas-liquid separator.

According to one aspect of the present disclosure, a heat pump cycle disclosed herein includes: a compressor that compresses refrigerant; a heat exchanger that exchanges heat between the refrigerant discharged from the compressor and indoor air; a gas-liquid separator that separates the refrigerant flowing out of the heat exchanger into gas phase and liquid phase; an outdoor heat exchanger that performs heat exchange between the refrigerant flowing out of the gas-liquid separator and outdoor air; a main circuit forming a flow path allowing the refrigerant to flow therethrough and connecting the compressor, the heat exchanger, the gas-liquid separator, and the outdoor heat exchanger; an exhaust-heat recovery heat exchanger that performs heat exchange between a heat source that releases heat and the refrigerant in liquid phase separated by the gas-liquid separator; an exhaust-heat recovery circuit forming a flow path in which the refrigerant in liquid phase flowing out of the gas-liquid separator flows to the compressor not through the outdoor heat exchanger but through the exhaust-heat recovery heat exchanger; and an expansion valve that is disposed upstream of the exhaust-heat recovery heat exchanger in the exhaust-heat recovery circuit and expands the refrigerant such that the refrigerant changes from liquid phase to gas phase in the exhaust-heat recovery heat exchanger.

According to the disclosed heat pump cycle, the refrigerant can be changed from liquid phase to gas phase by using exhaust heat recovered from the heat source by the exhaust-heat recovery heat exchanger before returning to the compressor. That is, an amount of the refrigerant returned to the compressor can be increased as compared with the comparative example where gas injection is performed using only gas-phase refrigerant separated by the gas-liquid separator. Therefore, vapor quality of gas-liquid two-phase refrigerant in the gas-liquid separator can be prevented from being high. Since the refrigerant can be circulated at low vapor quality in the heat pump cycle, heat exchange efficiency of the heat pump cycle can be enhanced.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. In addition to the combinations of parts specifically shown in the respective embodiments, the embodiments can be partly combined even if not explicitly suggested, unless such combinations are contradictory.

Hereinafter, a plurality of embodiments will be described with reference to the drawings. In some embodiments, parts which are functionally and/or structurally corresponding and/or associated are given the same reference numerals, or reference numerals with different hundreds digit or higher digits. For corresponding parts and/or associated parts, reference can be made to the description of other embodiments.

First Embodiment

In FIG. 1, a heat pump cycle 1 includes a compressor 11, a heating heat exchanger 12, a cooling heat exchanger 13, an outdoor heat exchanger 15, and an exhaust-heat recovery heat exchanger 31. The heat pump cycle 1 connects the compressor 11 and each of the heat exchangers 12, 13, 15, 31 to provide a refrigerant circuit through which refrigerant flows. The heat pump cycle 1 is mounted on an air conditioner that air-conditions a room. The heat pump cycle 1 is used, for example, for a vehicle air conditioner 2 which is installed in a vehicle and performs air conditioning in a vehicle compartment. The heat pump cycle 1 is capable of performing air-conditioning operations such as a cooling operation, a heating operation, and a dehumidifying operation. The heating heat exchanger 12 provides an example of a heat exchanger.

The refrigerant circuit includes a main circuit 10, an exhaust-heat recovery circuit 30, and a bypass circuit 40. The main circuit 10 makes a loop in which the compressor 11, the heating heat exchanger 12, the outdoor heat exchanger 15, and the cooling heat exchanger 13 are connected in series in flow of the refrigerant from upstream.

The compressor 11 is a two-stage compressor. That is, the compressor 11 includes therein two compression mechanisms: a lower-stage one and a higher-stage one. The compressor 11 has three ports: a discharge port 11a, an intermediate pressure port 11b, and a suction port 11c. The compressor 11 sucks gas-phase refrigerant from the suction port 11c, and compresses the gas-phase refrigerant in the lower-stage compression mechanism. Thereafter, the gas is further compressed in the higher-stage compression mechanism, and the gas-phase refrigerant is discharged from the discharge port 11a. Accordingly, the refrigerant is compressed by the compressor 11 so that the low-temperature and low-pressure gas-phase refrigerant becomes the high-temperature and high-pressure gas-phase refrigerant.

When gas injection is performed in the compressor 11, the gas-phase refrigerant before the outdoor heat exchanger 15 is taken in from the intermediate pressure port 11b. Thus, the gas-phase refrigerant compressed by the lower-stage compression mechanism and the gas-phase refrigerant taken in from the intermediate pressure port 11b are combined and compressed by the higher-stage compression mechanism. Therefore, an amount of refrigerant circulating through the compressor 11 can be increased, and a heating performance of the heating heat exchanger 12 can be increased.

In the main circuit 10, a gas-liquid separator 17 is provided between the heating heat exchanger 12 and the outdoor heat exchanger 15. In the main circuit 10, an accumulator 18 is provided between the cooling heat exchanger 13 and the compressor 11. The gas-liquid separator 17 is a device in which a refrigerant containing liquid-phase refrigerant and gas-phase refrigerant is separated into a liquid-phase refrigerant and a gas-phase refrigerant. The accumulator 18 is a device in which the refrigerant is separated into a liquid-phase refrigerant and a gas-phase refrigerant similarly to the gas-liquid separator 17, and only the separated gas-phase refrigerant flows to the compressor 11.

The heating heat exchanger 12, the cooling heat exchanger 13, and the outdoor heat exchanger 15 are heat exchangers that exchange heat with air. The heating heat exchanger 12 and the cooling heat exchanger 13 heat or cool inside air for air conditioning via heat exchange between the inside air and the refrigerant. The outdoor heat exchanger 15 cools or heats the refrigerant via heat exchange between outside air and the refrigerant. Each heat exchanger 12, 13, 15 is a parallel flow heat exchanger in which multiple refrigerant flow channels are provided parallel between two headers. The heat exchanger 12, 13, 15 includes flat refrigerant tubes having small flow passage areas and forming the flow channels for the refrigerant. The heat exchanger 12, 13, 15 includes an inner fin for increase in contact area with the refrigerant inside the refrigerant tubes in which the refrigerant circulates. The heat exchanger 12, 13, 15 are not limited to the parallel flow heat exchanger. For example, a fin and tube heat exchanger or a serpentine heat exchanger may be used.

In the main circuit 10, a higher-pressure expansion valve 22 is provided between the heating heat exchanger 12 and the gas-liquid separator 17. In the main circuit 10, a cooling expansion valve 23 is provided between the outdoor heat exchanger 15 and the cooling heat exchanger 13. The higher-pressure expansion valve 22 and the cooling expansion valve 23 are devices that causes a large amount of pressure loss in refrigerant flow by letting the refrigerant flow through a narrow flow path, thereby generating a pressure drop. That is, when the expansion valve 22, 23 is set to be in a throttled state, the flow path in the refrigerant tube is narrowed to reduce a pressure downstream of the expansion valve 22, 23. The expansion valves 22 and 23 are valve devices capable of arbitrarily adjusting a degree of throttling from a fully open state to a fully closed state. The higher-pressure expansion valve 22 is a valve device that controls a temperature of vent air for the heating operation which is determined by a high-pressure side pressure in the heating heat exchanger 12, i.e., a refrigerant condensation temperature. The higher-pressure expansion valve 22 is an expansion valve having a feature of variably controlling a degree of throttling of a valve flow path so that a high pressure detected by a high pressure sensor 39 becomes a target high pressure. The cooling expansion valve 23 is a general expansion valve that detects pressure and temperature indicating a state of the refrigerant at an outlet of the cooling heat exchanger 13 and controls its valve opening degree. The cooling expansion valve 23 is an electronic control valve that can be adjusted to an arbitrary valve opening degree. The cooling expansion valve 23 may be a self-contained mechanical expansion valve that does not require a temperature sensor or a pressure sensor. Either an externally equalized expansion valve or an internally equalized expansion valve can be used as the mechanical expansion valve.

In the main circuit 10, a lower-pressure throttle valve 25 is provided between the gas-liquid separator 17 and the outdoor heat exchanger 15. The lower-pressure throttle valve 25 is a device that narrows a flow path in the refrigerant circuit to reduce a pressure downstream of the lower-pressure throttle valve 25. The lower-pressure throttle valve 25 is a valve device in which a degree of throttling is fixed. That is, the lower-pressure throttle valve 25 is a valve device that cannot control the degree of throttling arbitrarily.

In the main circuit 10, a cooling open-close valve 24 is provided in a circuit capable of bypassing the cooling expansion valve 23 and the cooling heat exchanger 13. In the main circuit 10, a lower-pressure open-close valve 26 is provided in a circuit capable of bypassing the lower-pressure throttle valve 25. The cooling open-close valve 24 and the lower-pressure open-close valve 26 are valve devices that performs an opening and closing control of the refrigerant circuit to change a flow path of the refrigerant. When the open-close valves 24 and 26 are fully open, the refrigerant passes through the open-close valves 24 and 26. On the other hand, when the open-close valves 24 and 26 are fully closed, the refrigerant cannot pass through the open-close valves 24 and 26. The open-close valves 24 and 26 may be controlled to be in throttled states to allow some of the refrigerant to pass through the open-close valves 24 and 26, and the refrigerant may flow through multiple flow paths simultaneously.

The exhaust-heat recovery circuit 30 connects the gas-liquid separator 17 and the compressor 11 without passing through the outdoor heat exchanger 15. The exhaust-heat recovery circuit 30 is connected to a liquid-phase storage section of the gas-liquid separator 17 in which the refrigerant in liquid phase is stored. The exhaust-heat recovery circuit 30 includes, in flow of the refrigerant from upstream, an exhaust-heat recovery expansion valve 32, an exhaust-heat recovery open-close valve 33 and the exhaust-heat recovery heat exchanger 31. However, as for the positional relationship between the exhaust-heat recovery expansion valve 32 and the exhaust-heat recovery open-close valve 33, either one may be disposed upstream.

The exhaust-heat recovery expansion valve 32 is a valve device that expands the liquid-phase refrigerant flowing through the exhaust-heat recovery circuit 30 by reducing the pressure of the liquid-phase refrigerant, thereby promoting evaporation of the refrigerant. The exhaust-heat recovery expansion valve 32 is a valve device that maintains the refrigerant flowing out of the exhaust-heat recovery heat exchanger 31 at a certain degree of superheat. In other words, by adjusting an opening degree of the exhaust-heat recovery expansion valve 32, a degree of superheat of the refrigerant flowing out of the exhaust-heat recovery heat exchanger 31 is kept substantially constant. Therefore, the refrigerant is prevented from returning to the intermediate pressure port 11*b* of the compressor 11 in a liquid state. That is, the exhaust-heat recovery expansion valve 32 reduces occurrence of a liquid floodback phenomenon in the compressor 11. Further, the exhaust-heat recovery expansion valve 32 reduces inflow of the refrigerant having an excessive degree of superheat into the intermediate pressure port 11*b* of the compressor 11. The exhaust-heat recovery expansion valve 32 is a valve device that is controlled to perform a high-efficiency operation while avoiding liquid compression of the compressor 11 and abnormal rise in temperature. The exhaust-heat recovery expansion valve 32 is an electronic control valve that can be adjusted to an arbitrary valve opening. The exhaust-heat recovery expansion valve 32 may be a mechanical expansion valve instead of the electronic control valve and may convert a mechanical force using a self-contained physical phenomenon that does not require an exhaust-heat recovery temperature sensor 36 or an exhaust-heat recovery pressure sensor 35. Either an externally equalized expansion valve or an internally equalized expansion valve can be used. The exhaust-heat recovery open-close valve 33 is a valve device that controls allowing and blocking of flow of the liquid-phase refrigerant through the exhaust-heat recovery circuit 30. The exhaust-heat recovery expansion valve 32 provides an example of an expansion valve.

The exhaust-heat recovery heat exchanger 31 is a heat exchanger that recovers heat discharged from a heat source. The exhaust-heat recovery heat exchanger 31 performs heat exchange between a heat exchange medium heated by the heat source and the refrigerant flowing inside the exhaust-heat recovery heat exchanger 31. The heat exchange medium is, for example, air. However, the heat exchange medium to which heat is transmitted from the heat source is not limited to air, but may be water, oil or refrigerant. Alternatively, the heat of the heat source may be transmitted to the heat exchange medium using a metal plate having good heat conductivity.

For example, the compressor 11 can be used as the heat source which exchanges heat with the exhaust-heat recovery heat exchanger 31. Furthermore, when the heat pump cycle 1 is mounted on a gasoline-powered vehicle, a heat-generating component such as an engine can be used as the heat source. Alternatively, high-temperature exhaust gas discharged from the engine may be used as the heat source. When the heat pump cycle 1 is mounted on a hybrid vehicle or an electric vehicle, a heat-generating component such as a battery, a drive motor, a generator, an inverter, or a high power output control module (PCU) can be used as the heat source. The number of heat sources is not limited to one, and the exhaust heat may be recovered from multiple heat sources.

The bypass circuit 40 connects the gas-liquid separator 17 and exhaust-heat recovery circuit 30 without passing through the outdoor heat exchanger 15 and forms a flow path leading to the compressor 11. The bypass circuit 40 is connected to a gas-phase storage section of the gas-liquid separator 17 in which the refrigerant in gas phase is stored. The bypass circuit 40 and the exhaust-heat recovery circuit 30 are connected at a junction 42 so that the gas-phase refrigerants merge. The junction 42 is provided between the exhaust-heat recovery heat exchanger 31 and the compressor 11 in the exhaust-heat recovery circuit 30. Alternatively, as a portion where the bypass circuit 40 and the exhaust-heat recovery circuit 30 join, the exhaust-heat recovery expansion valve 32 may be located upstream and the exhaust-heat recovery open-close valve 33 may be located downstream. The bypass circuit 40 may be connected to a part of the exhaust-heat recovery circuit 30 therebetween so that the liquid-phase refrigerant and the gas-phase refrigerant merge. In this case, the gas injection can be stopped by fully closing the exhaust-heat recovery open-close valve 33. Therefore, it is suitable for a system that requires an operation mode that eliminates the gas injection operation function. In the bypass circuit 40, a bypass throttle valve 41 is provided. The bypass throttle valve 41 is a valve device that reduces a large amount of gas-phase refrigerant flowing through the bypass circuit 40 at one time. The bypass throttle valve 41 provides a bypass decompression valve.

In the exhaust-heat recovery circuit 30, an exhaust-heat recovery pressure sensor 35 and an exhaust-heat recovery temperature sensor 36 are provided between the junction 42 and the compressor 11. The exhaust-heat recovery pressure sensor 35 is a sensor that measures a pressure of the refrigerant flowing through the refrigerant circuit. The exhaust-heat recovery temperature sensor 36 is a sensor that measures a temperature of the refrigerant flowing through the refrigerant circuit. In other words, the exhaust-heat recovery pressure sensor 35 and the exhaust-heat recovery temperature sensor 36 are sensors that measure a state quantity of the refrigerant. The exhaust-heat recovery pressure sensor 35 and the exhaust-heat recovery temperature sensor 36 are provided immediately before the intermediate pressure port 11b. The exhaust-heat recovery pressure sensor 35 and the exhaust-heat recovery temperature sensor 36 provide an example of a sensor.

Figure 2:
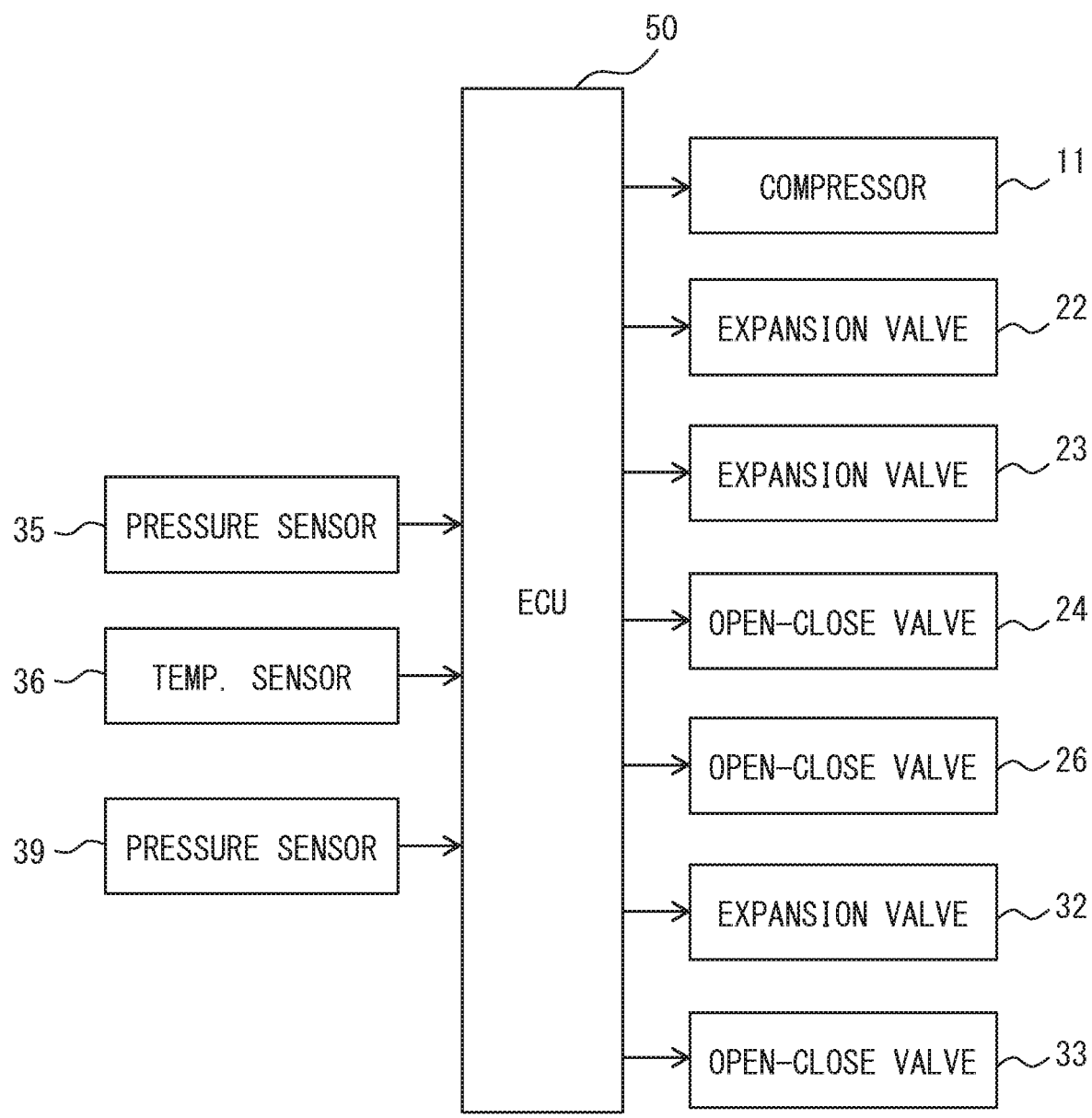
FIG. 2 is a block diagram relating to control of a heat pump cycle.

In FIG. 2, a controller (ECU) 50 receives a signal from, for example, a sensor of the heat pump cycle 1. The controller 50 performs an arithmetic process for determining a control content of the heat pump cycle 1. The controller 50 outputs signals for controlling the heat pump cycle 1. The exhaust-heat recovery pressure sensor 35 and the exhaust-heat recovery temperature sensor 36 are connected to the controller 50. That is, the state quantities: pressure and temperature of the gas-phase refrigerant that has passed through the exhaust-heat recovery heat exchanger 31 are input to the controller 50. The high pressure sensor 39 is connected to the controller 50. That is, the pressure of the refrigerant that has passed through the heating heat exchanger 12 is input to the controller 50.

The compressor 11, the expansion valves 22, 23, 32 and the open-close valves 24, 26, 33 are connected to the controller 50. That is, driving of the compressor 11 is controlled by the controller 50. In other words, the controller 50 performs an on/off control and an output intensity control of the compressor 11. The openings of the expansion valves 22, 23, and 32 are controlled by the controller 50. The open/closed state of the open-close valves 24, 26, and 33 are controlled by the controller 50.

In FIG. 1, a high-temperature and high-pressure gas-phase refrigerant discharged from the compressor 11 flows through the main circuit 10 connected to the discharge port 11a, and then flows into the heating heat exchanger 12. In the heating heat exchanger 12, the high-temperature and high-pressure gas-phase refrigerant becomes liquid-phase refrigerant via heat exchange with the inside air. That is, energy of the refrigerant is given to the inside air such that the inside air is heated in the process of the refrigerant flowing through the heating heat exchanger 12. The heating heat exchanger 12 is a condenser that condenses gas-phase refrigerant into liquid-phase refrigerant.

The liquid-phase refrigerant flowing out of the heating heat exchanger 12 is controlled in high pressure by adjustment of the valve opening degree of the higher-pressure expansion valve 22, that is, the condensation temperature in the heating heat exchanger 12 is controlled. The liquid-phase refrigerant downstream of the higher-pressure expansion valve 22 is decompressed and expanded by a throttling effect. Thus, the high-pressure liquid-phase refrigerant flowing out of the heating heat exchanger 12 is decompressed and changes into an intermediate-pressure gas-liquid two-phase refrigerant. The higher-pressure expansion valve 22 is a pressure reducing device that reduces the pressure of the high pressure refrigerant to an intermediate pressure.

The refrigerant that has been decompressed by the higher-pressure expansion valve 22 and changed into the gas-liquid two-phase flows into the gas-liquid separator 17. The gas-liquid separator 17 separates the refrigerant into two states: a liquid-phase refrigerant and a gas-phase refrigerant. However, in the gas-liquid separator 17, a liquid surface of the liquid-phase refrigerant is in contact with the gas-phase refrigerant. Since the gas-phase refrigerant enters and mixes with the liquid-phase refrigerant, a vapor quality of the gas-liquid two-phase refrigerant increases. The gas-liquid separator 17 is provided with three flow paths: a flow path leading to the main circuit 10; a flow path leading to the exhaust-heat recovery circuit 30; and a flow path leading to the bypass circuit 40. The case of the refrigerant flowing to the exhaust-heat recovery circuit 30 and the case of the refrigerant flowing to the bypass circuit 40 will be described later.

The liquid-phase refrigerant separated by the gas-liquid separator 17 flows toward the outdoor heat exchanger 15 through the main circuit 10. The flow path toward the outdoor heat exchanger 15 is branched into two flow paths: a flow path passing through the lower-pressure throttle valve 25 and a flow path passing through the lower-pressure open-close valve 26. In the cooling operation or the dehumidifying operation, the lower-pressure open-close valve 26 is fully opened. In the heating operation, the lower-pressure open-close valve 26 is fully closed. Here, when the lower-pressure open-close valve 26 is fully open, the liquid-phase refrigerant flows into the outdoor heat exchanger 15 through the lower-pressure open-close valve 26. On the other hand, when the lower-pressure open-close valve 26 is fully closed, the liquid-phase refrigerant flows into the outdoor heat exchanger 15 through the lower-pressure throttle valve 25. The liquid-phase refrigerant is decompressed when passing through the lower-pressure throttle valve 25. That is, the lower-pressure throttle valve 25 is a pressure reducing device that reduces the pressure of the refrigerant to expand the refrigerant.

In the cooling operation, the liquid-phase refrigerant flowing into the outdoor heat exchanger 15 exchanges heat with the outside air in a process flowing through the outdoor heat exchanger 15 such that the liquid state of the refrigerant is maintained and decreases in temperature. On the other hand, in the heating operation, the liquid-phase refrigerant is heated by the outside air in the outdoor heat exchanger 15 and evaporates to be a gas-phase refrigerant. A blower may be provided to blow the outside air to the outdoor heat exchanger 15 to promote the heat exchange between the refrigerant and the outside air.

The refrigerant, which has flowed through the outdoor heat exchanger 15 and become a low-temperature refrigerant, flows toward the cooling heat exchanger 13. In the cooling operation or the dehumidifying operation, the cooling open-close valve 24 is fully closed, and the liquid-phase refrigerant flows through the cooling expansion valve 23 and the cooling heat exchanger 13. The liquid-phase refrigerant, which has been slightly decompressed in the outdoor heat exchanger 15 and decreased in temperature, is further decompressed and expanded by the cooling expansion valve 23. As a result, the pressure of the liquid-phase refrigerant is reduced to be easily evaporated. Thereafter, the low-temperature and low-pressure liquid-phase refrigerant flowing out of the cooling expansion valve 23 flows into the cooling heat exchanger 13. In the cooling heat exchanger 13, the low-temperature and low-pressure liquid-phase refrigerant becomes gas-phase refrigerant via heat exchange with the inside air. That is, the refrigerant absorbs energy from the inside air such that the inside air is cooled in the process of the refrigerant flowing through the cooling heat exchanger 13. The cooling heat exchanger 13 is an evaporator that evaporates liquid-phase refrigerant into gas-phase refrigerant. The gas-phase refrigerant evaporated in the cooling heat exchanger 13 flows into the accumulator 18. On the other hand, in the heating operation, the cooling open-close valve 24 is fully open, and the gas-phase refrigerant flows into the accumulator 18 through the cooling open-close valve 24 without flowing through the cooling expansion valve 23 and the cooling heat exchanger 13.

The gas-phase refrigerant flowing into the accumulator 18 is separated into a liquid-phase refrigerant and a gas-phase refrigerant by the accumulator 18, and only the gas-phase refrigerant is sucked into the suction port 11*c* and compressed by the compressor 11. In the heat pump cycle 1, the refrigerant circulates in the main circuit 10 and repeats a series of cycles as described above.

The flow of the refrigerant from the gas-liquid separator 17 to the exhaust-heat recovery circuit 30 will be described below. The liquid-phase refrigerant separated by the gas-liquid separator 17 flows into the exhaust-heat recovery expansion valve 32 through the exhaust-heat recovery circuit 30. The liquid phase refrigerant is decompressed and expanded by the exhaust-heat recovery expansion valve 32. In other words, the exhaust-heat recovery expansion valve 32 is a decompression device that decompresses the liquid-phase refrigerant to be easily evaporated. The liquid-phase refrigerant decompressed by the exhaust-heat recovery expansion valve 32 flows to the exhaust-heat recovery open-close valve 33.

The exhaust-heat recovery open-close valve 33 opens and closes the flow path of the exhaust-heat recovery circuit 30. That is, in a fully open state, the liquid-phase refrigerant is allowed to flow to the exhaust-heat recovery heat exchanger 31, and in a fully closed state, the liquid-phase refrigerant is not allowed to flow to the exhaust-heat recovery heat exchanger 31. When an amount of gas injection performed in the compressor 11 is reduced, the exhaust-heat recovery open-close valve 33 is fully closed. When the exhaust-heat recovery expansion valve 32 can realize the fully closed state, the exhaust-heat recovery open-close valve 33 may be omitted.

The liquid-phase refrigerant that has passed through the exhaust-heat recovery open-close valve 33 flows into the exhaust-heat recovery heat exchanger 31. The exhaust-heat recovery heat exchanger 31 changes the liquid-phase refrigerant into a gas-phase refrigerant via heat exchange between the liquid-phase refrigerant and heat emitted from the heat source. That is, the exhaust-heat recovery heat exchanger 31 is an evaporator that removes energy from exhaust heat and evaporates the refrigerant. In other words, the exhaust-heat recovery heat exchanger 31 recovers the exhaust heat from the heat source while the outdoor heat exchanger 15 recovers the heat from the outside air. At this time, the refrigerant recovers the exhaust heat, that is, a large amount of latent heat due to a phase change from a liquid phase to a gaseous phase and a small amount of sensible heat due to a temperature change of the refrigerant. The evaporated gas-phase refrigerant passes through the junction 42 and is taken into the intermediate pressure port 11*b*.

The refrigerant immediately before being taken into the intermediate pressure port 11*b* is a mixed gas-phase refrigerant after the junction 42 between the exhaust-heat recovery circuit 30 and the bypass circuit 40. The state quantities of the pressure and temperature of the gas-phase refrigerant are measured by the exhaust-heat recovery pressure sensor 35 and the exhaust-heat recovery temperature sensor 36. When the controller 50 detects an abnormally high refrigerant pressure measured by the exhaust-heat recovery pressure sensor 35, the controller 50 fully closes the exhaust-heat recovery open-close valve 33, and only the gas-phase refrigerant of the gas-liquid separator 17 is gas-injected into the intermediate pressure port 11*b*. When the controller 50 detects an abnormally high refrigerant temperature measured by the exhaust-heat recovery temperature sensor 36, the controller 50 determines that an amount of the liquid-phase refrigerant flowing to the exhaust-heat recovery heat exchanger 31 is insufficient. In this case, the opening degree of the exhaust-heat recovery expansion valve 32 is controlled to be increased so that an amount of the liquid phase refrigerant circulating through the exhaust-heat recovery heat exchanger 31 increases.

In a normal control, not in such abnormal states, a state of the gas-phase refrigerant, that is, a degree of superheat is constantly calculated and recognized using the detected values of the pressure and the temperature. An opening degree of the exhaust-heat recovery expansion valve 32 is controlled to be adjusted so that the degree of superheat falls within a predetermined range of the target appropriate degree of superheat.

In accordance with the measured pressure and temperature, the opening degree of the exhaust-heat recovery expansion valve 32 and the exhaust-heat recovery open-close valve 33 is controlled based on information including the control target value of the degree of superheat stored in advance as a characteristic diagram. Since this control enables an appropriate amount of the gas-phase refrigerant to return to the intermediate pressure port 11*b* of the compressor 11, compression of liquid refrigerant in the compressor 11 can be eliminated. Further, refrigerant having an excessive degree of superheat is not sucked into the compressor 11. Therefore, an efficiency of the compressor 11 can be improved and a circulation rate of the refrigerant is increased. Here, the characteristic diagram may be obtained by mapping controlled contents of a control target controlled by the controller 50 with respect to information, for example, an operation mode such as heating operation and cooling operation, a refrigerant pressure, a refrigerant temperature, and a heat source temperature. That is, the characteristic diagram may be obtained by mapping the controlled contents such as an input to the compressor 11, the opening degrees of the expansion valves 22, 23, 32, and the opening degrees of the open-close valves 24, 26, 33 with respect to the information such as the operation mode and the state quantity of the refrigerant. The controller 50 automatically and optimally controls an output based on current use conditions thereof. Further, an outside air temperature sensor may be provided to detect the outside air temperature, and the control may be performed based on the outside air temperature. In particular, when the outside air temperature is high and the heating operation is unnecessary in summer or the like, the exhaust-heat recovery open-close valve 33 may be fully closed.

The flow of the refrigerant from the gas-liquid separator 17 to the bypass circuit 40 will be described below. The gas-phase refrigerant separated by the gas-liquid separator 17 passes through the bypass throttle valve 41 in the bypass circuit 40. The gas-phase refrigerant is decompressed in a process passing through the bypass throttle valve 41. The bypass throttle valve 41 is means for reducing a pressure of the gas-phase refrigerant, and is means for adjusting a flow rate of the gas-phase refrigerant.

The gas-phase refrigerant that has passed through the bypass throttle valve 41 is joined and mixed at the junction 42 with the refrigerant that has become gas-phase refrigerant in the exhaust-heat recovery heat exchanger 31. The mixed gas-phase refrigerant is taken into the compressor 11 from the intermediate pressure port 11*b*.

Since the gas-phase refrigerant in the gas-liquid separator 17 is returned to the compressor 11 without passing through the outdoor heat exchanger 15, the vapor quality of the gas-liquid two-phase refrigerant in the gas-liquid separator 17 can be reduced. That is, since the vapor quality can be reduced by removing the gas-phase refrigerant from the gas-liquid separator 17 to flow to the bypass circuit 40, the refrigerant can be sent to the outdoor heat exchanger 15 and the exhaust-heat recovery circuit 30 in liquid phase.

Therefore, in the heating operation, when the refrigerant evaporates in the outdoor heat exchanger 15 of the main circuit 10, the specific enthalpy of the refrigerant on an inlet side of the outdoor heat exchanger 15 decreases. Thus, an enthalpy difference between the inlet and outlet of the outdoor heat exchanger 15 increases, and an amount of heat that can be absorbed from an outside air heat source such as outside air can be increased, and therefore, a heating performance is improved. Consequently, the inflow of refrigerant with low specific enthalpy into the outdoor heat exchanger 15 can increase a heat exchange efficiency of the heat pump cycle 1. In addition, since the gas-phase refrigerant can be prevented from entering the outdoor heat exchanger 15, the performance of heat exchange of the outdoor heat exchanger 15 can be stabilized.

On the other hand, in the exhaust-heat recovery circuit 30, the refrigerant flowing into the exhaust-heat recovery expansion valve 32 can be a liquid-phase refrigerant, which can reduce the entrapment of gas bubbles. Therefore, first, the refrigerant can be supplied at a large flow rate, and a large amount of exhaust heat can be reused as a large heat source for the heating operation. Further, the flow rate of the refrigerant flowing into the exhaust-heat recovery heat exchanger 31 is stabilized. Thus, the performance of detecting the refrigerant pressure and the refrigerant temperature at the outlet of the exhaust-heat recovery heat exchanger 31 is improved. Therefore, the value of the degree of superheat of the gas-phase refrigerant flowing into the intermediate pressure port 11b of the compressor 11 under the control of the exhaust-heat recovery expansion valve 32 is stabilized.

A large heat source for the heating operation can be obtained in the exhaust-heat recovery circuit 30. An amount of heat source for the heating operation obtained from the outside air can be reduced accordingly. Therefore, the flow rate of the refrigerant circulating in the main circuit 10 can be reduced. Therefore, an amount of pressure loss in refrigerant flow path section from the outdoor heat exchanger 15 to the suction port 11c of the compressor 11 can be reduced. That is, since the suction pressure of the compressor 11 increases, the amount of refrigerant discharged from the compressor 11 increases even when the compressor 11 is driven with the same input. In other words, the input of the compressor 11 can be reduced. Thus, a synergistic effect of combining such effect of power saving of the compressor 11 and improvement of the heating performance by gas injection can be exhibited without being cancelled each other out.

According to the above-described embodiment, a part of the liquid-phase refrigerant of the gas-liquid separator 17 flows toward the exhaust-heat recovery heat exchanger 31, and at the same time, the gas-phase refrigerant collected in the gas-liquid separator 17 is supplied to the bypass circuit 40 and returned to the compressor 11. Thus, an amount of the liquid-phase refrigerant accumulated in the gas-liquid separator 17 can be reduced, and an internal capacity and size of the gas-liquid separator 17 can be reduced. Further, the liquid-phase refrigerant is actively allowed to flow to the exhaust-heat recovery heat exchanger 31 and changes in state into the gas-phase refrigerant to provide latent heat by which overwhelmingly large heat exchange can be performed. Therefore, the exhaust-heat recovery heat exchanger 31 can be downsized by utilizing the latent heat and efficiently retrieving exhaust heat. In other words, the heat pump cycle 1 can be downsized.

The junction 42 is located downstream of the exhaust-heat recovery heat exchanger 31 in the exhaust-heat recovery circuit 30. Therefore, the gas-phase refrigerant does not enter the inlet side of the exhaust-heat recovery heat exchanger 31. In other words, increase in vapor quality of the refrigerant flowing into the exhaust-heat recovery heat exchanger 31 can be reduced. Therefore, the heat exchange efficiency in the exhaust-heat recovery heat exchanger 31 can be increased, and the exhaust heat from the heat source can be efficiently recovered. In other words, the heat source can be efficiently cooled.

The exhaust-heat recovery circuit 30 is connected to the intermediate pressure port 11b. Therefore, the gas-phase refrigerant that has changed into gas phase in the exhaust-heat recovery heat exchanger 31 can be returned in pressure to an intermediate pressure and compressed again. That is, an amount of the refrigerant circulating in the heating heat exchanger 12 can be increased by a synergistic effect of combination of the exhaust heat recovery effect and the gas injection effect, without the refrigerant passing through components having large pressure loss such as the outdoor heat exchanger 15 and the cooling heat exchanger 13. Therefore, the heating performance of the heating heat exchanger 12 can be increased.

The controller 50 controls the opening degree of the exhaust-heat recovery expansion valve 32 based on detection results of the exhaust-heat recovery pressure sensor 35 and the exhaust-heat recovery temperature sensor 36. Hence, the amount of the liquid-phase refrigerant flowing through the exhaust-heat recovery heat exchanger 31 can be controlled according to the current state quantities such as the pressure and the temperature. Therefore, malfunctions of the heat pump cycle 1 due to an abnormal pressure being applied to the intermediate pressure port 11b can be reduced. Further, even when the exhaust heat from the heat source is very large and a large amount of refrigerant is required to flow through the exhaust-heat recovery heat exchanger 31, an appropriate amount of refrigerant can flow therethrough. That is, the heat source can be appropriately cooled.

An air-conditioning operation can be performed using the exhaust heat from heat-generating components such as a battery and a drive motor. Therefore, when the heat pump cycle 1 is applied to an electric vehicle or a hybrid vehicle, an amount of energy consumed by an electric heater for the heating operation can be reduced. That is, an electric energy consumed in the heating operation can be reduced, and the vehicle traveling distance can be extended. Also, it is easy to stably exhibit a high heating capacity even in winter or cold regions where the outside temperature is low.

Second Embodiment

This embodiment is a modification based on the preceding embodiment. In this embodiment, an exhaust-heat recovery circuit 30 is connected to a compressor 221 such that refrigerant from the exhaust-heat recovery circuit 30 is sucked into a suction port 211c of the compressor 211 through an accumulator 18. Further, a gas-liquid separator 17 includes a liquid level sensor 261.

Figure 3:
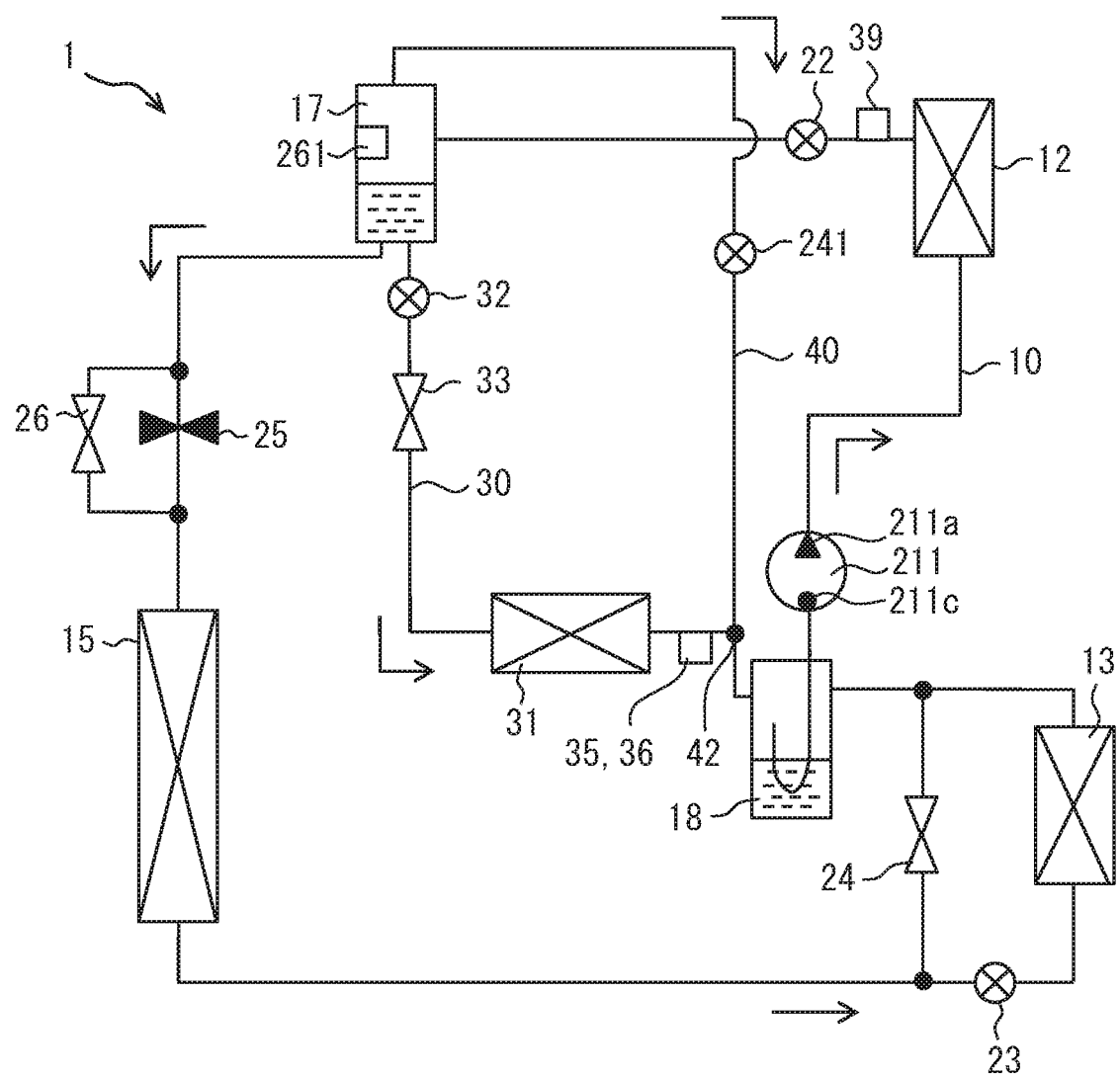
FIG. 3 is a diagram illustrating a configuration of a heat pump cycle according to at least one embodiment.

In FIG. 3, the exhaust-heat recovery circuit 30 is provided so as to connect the gas-liquid separator 17 and the accumulator 18 of the main circuit 10. That is, the exhaust-heat recovery circuit 30 is connected to an upper region of the accumulator 18 which is a gas storage portion. Therefore, the refrigerant flowing out from the gas-liquid separator 17 to the exhaust-heat recovery circuit 30 is sucked into the compressor 211 via the accumulator 18 to be compressed.

The refrigerant flowing out from the gas-liquid separator 17 to the bypass circuit 40 joins with the exhaust-heat recovery circuit 30 and is then sucked into the compressor 211 via the accumulator 18 and compressed. The compressor 211 is a single-stage compressor without a port located at an intermediate pressure. That is, the compressor 211 is a compression device that performs compression by one compression mechanism. The compressor 211 provides a single stage compressor.

In the bypass circuit 40, a bypass decompression valve 241 is provided. The bypass decompression valve 241 is a device that causes a large amount of pressure loss in refrigerant flow by letting the refrigerant flow through a narrow flow path, thereby generating a pressure drop. That is, when the bypass decompression valve 241 is set to be in a throttled state, the flow path in the refrigerant tube is narrowed to reduce a pressure downstream of the bypass decompression valve 241. The bypass decompression valve 241 is a valve device capable of arbitrarily adjusting a degree of throttling from a fully open state to a fully closed state.

The gas-liquid separator 17 includes the liquid level sensor 261. The liquid level sensor 261 is a sensor provided inside the gas-liquid separator 17 and measures a height of a liquid surface of the liquid refrigerant. That is, the higher the liquid level, the more the liquid-phase refrigerant is in the gas-liquid separator 17. On the other hand, the lower the liquid level, the less the liquid-phase refrigerant is in the gas-liquid separator 17. The liquid level sensor 261 is connected to the controller 50. That is, a liquid level measured by the liquid level sensor 261 is input to the controller 50.

When the liquid level is high, the liquid-phase refrigerant easily flows into the main circuit 10 and the exhaust-heat recovery circuit 30. However, the liquid-phase refrigerant is also likely to flow into the bypass circuit 40. Thus, in order to avoid compression of liquid refrigerant due to return of the liquid refrigerant to the compressor 211, the controller 50 narrows a flow path of the bypass circuit 40 by increasing the degree of throttle of the bypass decompression valve 241 that can be arbitrarily adjusted in valve opening degree. As a result, liquid compression in the compressor 211 can be avoided, and the refrigerant sucked into the suction port 211c of the compressor 211 can be always gas-phase refrigerant. In other words, since a degree of superheat of the refrigerant is controlled before being sucked into the compressor 211, the compressor 211 can maintain a highly efficient operation.

When the liquid level is low, the gas-liquid two-phase refrigerant containing gas bubbles easily flows into the main circuit 10 and the exhaust-heat recovery circuit 30. The controller 50 expands the flow path of the bypass circuit 40 by reducing the degree of throttle of the bypass decompression valve 241. Thereby, a large amount of gas-phase refrigerant is removed from an inside of the gas-liquid separator 17. In other words, the gas-phase refrigerant flows out into the bypass circuit 40 and is sucked into the compressor 211. As a result, the liquid level of the liquid-phase refrigerant inside the gas-liquid separator 17 increases, and the vapor quality of the refrigerant flowing to the main circuit 10 and the exhaust-heat recovery circuit 30 decreases. Accordingly, the refrigerant flow rate in each refrigerant circuit increases, the outside air heat source and the exhaust-heat recovery heat source increases, and thereby the heating performance improves.

The controller 50 controls the bypass decompression valve 241 based on the liquid level measured by the liquid level sensor 261 as described above. As a result, the liquid level can be prevented from becoming abnormally high or abnormally low. In other words, the controller 50 controls the bypass decompression valve 241 so that the liquid level falls within an appropriate range. The controller 50 may control the higher-pressure expansion valve 22 and the exhaust-heat recovery expansion valve 32 in addition to controlling the bypass decompression valve 241 according to the liquid level. Alternatively, a magnitude of the input to the compressor 211 may be controlled so that the liquid level falls within an appropriate range. Further, the opening degree of the bypass decompression valve 241 may be controlled based on the state quantity of the refrigerant measured by the exhaust-heat recovery pressure sensor 35 or the exhaust-heat recovery temperature sensor 36.

The exhaust-heat recovery pressure sensor 35 and the exhaust-heat recovery temperature sensor 36 are provided between the junction 42 and the exhaust-heat recovery heat exchanger 31. That is, it is detected from the state quantities of pressure and temperature whether the refrigerant that has flowed out of the exhaust-heat recovery heat exchanger 31 passes in liquid phase, and whether a low-density gas-phase refrigerant that has an excessively high degree of superheat and has become too hot passes.

If the controller 50 determines that the liquid refrigerant having too small degree of superheat passes through the exhaust-heat recovery heat exchanger 31 and the liquid refrigerant flows into the compressor 211, the controller 50 throttles the exhaust-heat recovery expansion valve 32 to reduce the flow path. The controller 50 reduces the amount of the liquid-phase refrigerant flowing into the exhaust-heat recovery heat exchanger 31 such that the liquid-phase refrigerant can be completely changed into the gas-phase refrigerant in the exhaust-heat recovery heat exchanger 31. In other words, the controller 50 controls the opening degree of the exhaust-heat recovery expansion valve 32 so as not to cause liquid floodback phenomenon in which the liquid-phase refrigerant is sucked into the compressor 211 by the liquid-phase refrigerant passing through the exhaust-heat recovery heat exchanger 31.

On the other hand, if it is determined that the low-density gas-phase refrigerant that has excessively high degree of superheat and has become high temperature has flowed into the compressor 211, the exhaust-heat recovery expansion valve 32 is opened to enlarge the flow path. Accordingly, the amount of the liquid-phase refrigerant flowing into the exhaust-heat recovery heat exchanger 31 is controlled to be increased, and thereby the degree of superheat is reduced.

In a normal control, a state of the gas-phase refrigerant, that is, a degree of superheat is constantly calculated and recognized using the detected values of the pressure and the temperature. An opening degree of the exhaust-heat recovery expansion valve 32 is controlled to be adjusted so that the degree of superheat becomes the target appropriate degree of superheat. Since the appropriately-controlled gas-phase refrigerant returns to the suction port 211c of the compressor 211, compression of liquid refrigerant in the compressor 211 can be eliminated. Further, durability malfunctions due to abnormally high temperature operation in which the refrigerant having an excessively high superheat is sucked into the compressor 211 can be eliminated. Further, an efficiency of the compressor 211 can be improved and a circulation rate of the refrigerant is increased.

According to the above-described embodiment, the lower the liquid level measured by the liquid level sensor 261, the greater the amount of refrigerant flowing through the bypass circuit 40 by opening the bypass decompression valve 241.

On the other hand, the lower the liquid level measured by the liquid level sensor 261, the smaller the amount of refrigerant flowing through the bypass circuit 40 by reducing in opening degree of the bypass decompression valve 241. Thus, the amount of the refrigerant flowing through the bypass circuit 40 is controlled according to the level of the liquid level. In the heat pump cycle, in general, a flow rate of the circulating refrigerant and a balance pressure of the refrigerant between higher and lower pressures always fluctuate due to differences in heat load conditions such as air temperature of use environment. The fluctuation leads fluctuation in refrigerant liquid level in the gas-liquid separator 17 and width of a bubble region where gas and liquid are mixed. Therefore, when the bypass throttle valve 41 having a size-fixed refrigerant passage, it is necessary to set an appropriate throttle amount according to the use environment. Instead, the control of the amount of the refrigerant flowing to the bypass circuit 40 provides stable gas-liquid separation performance and constant liquid level control in response to changes in the use environment. Therefore, a refrigerant having a small degree of vapor quality can be made to flow through the main circuit 10 and the exhaust-heat recovery circuit 30 over a wide range of use environment, and high-exhaust heat recovery performance and high heating performance can be obtained. Further, individual setting of throttle degree of valves is not necessary, and the versatility is increased. Further, the size of the gas-liquid separator 17 can be reduced.

Third Embodiment

This embodiment is a modification based on the preceding embodiment. In this embodiment, a junction 342 is provided between an exhaust-heat recovery expansion valve 32 and an exhaust-heat recovery open-close valve 33. The compressor 311 includes a lower-stage compressor 311a and a higher-stage compressor 311b.

Figure 4:
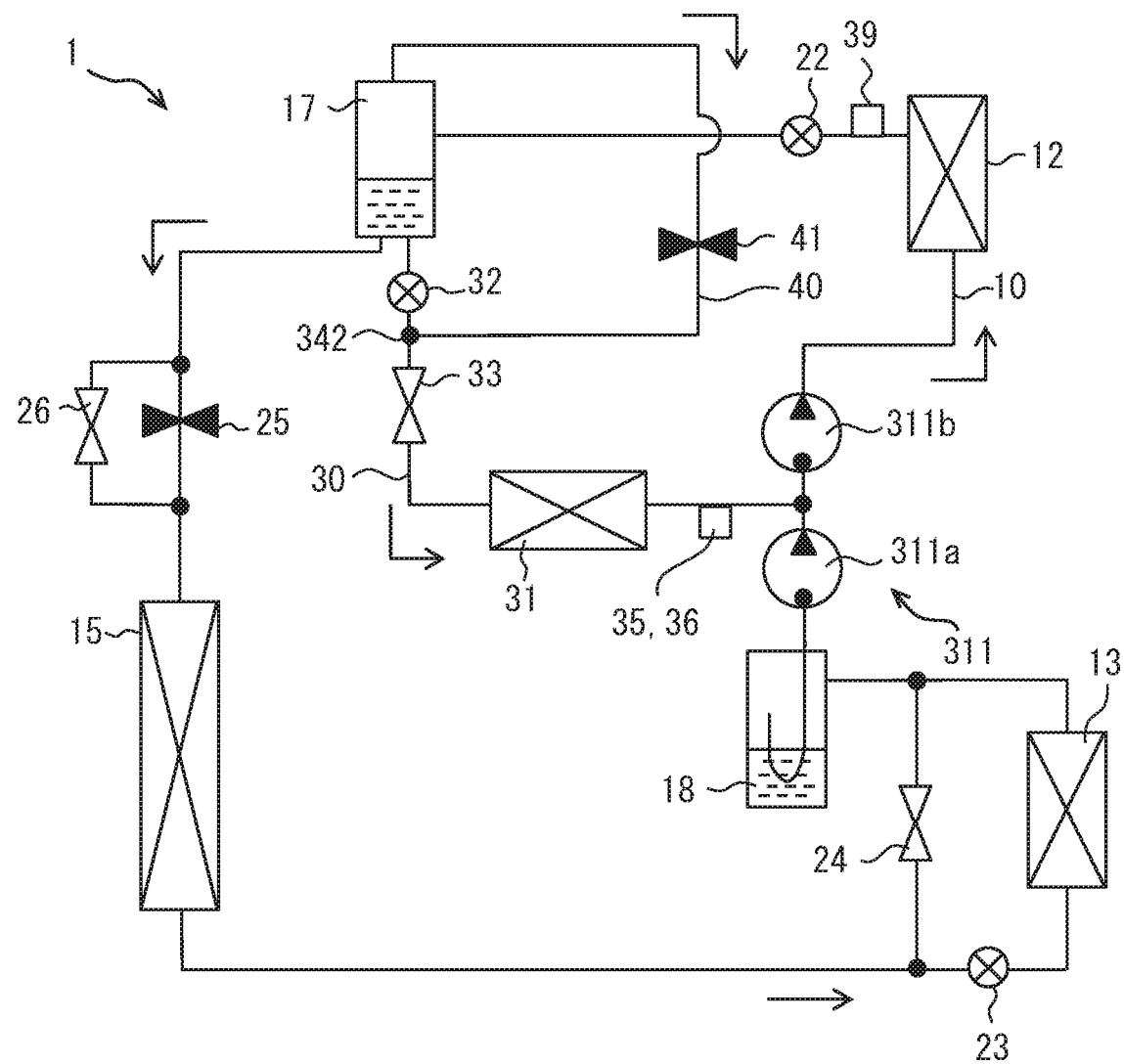
FIG. 4 is a diagram illustrating a configuration of a heat pump cycle according to at least one embodiment.

In FIG. 4, the junction 342 is provided between the exhaust-heat recovery expansion valve 32 and the exhaust-heat recovery open-close valve 33. Therefore, the refrigerant flows into the exhaust-heat recovery heat exchanger 31 in a state of gas-liquid mixed refrigerant, that is, a state of gas-liquid two-phase refrigerant, in which liquid-phase refrigerant and gas-phase refrigerant are mixed. The gas-liquid two-phase refrigerant is heated by the exhaust-heat recovery heat exchanger 31, changes into gas-phase refrigerant, and returns to the compressor 311.

The junction 342 is located upstream of the exhaust-heat recovery open-close valve 33. Therefore, when the exhaust-heat recovery open-close valve 33 is fully closed, a flow of refrigerant in both the exhaust-heat recovery circuit 30 and the bypass circuit 40 can be shut off. That is, gas injection into the compressor 311 can be stopped, and the heat pump cycle 1 can be operated in a normal cycle.

The compressor 311 includes the lower-stage compressor 311a and the higher-stage compressor 311b which are arranged in series. The lower-stage compressor 311a compresses a low-pressure gas-phase refrigerant that has passed through the accumulator 18 to become an intermediate-pressure refrigerant. The higher-stage compressor 311b compresses the intermediate-pressure gas-phase refrigerant compressed by the lower-stage compressor 311a to become a high-pressure refrigerant. That is, the compressor 311 is a device that compresses gas-phase refrigerant at two stages to produce high-temperature and high-pressure gas-phase refrigerant. The outlet of the lower-stage compressor 311a and the inlet of the higher-stage compressor 311b are connected by a refrigerant pipe.

The exhaust-heat recovery circuit 30 is connected to the refrigerant pipe connecting the lower-stage compressor 311a and the higher-stage compressor 311b. Thus, the gas-phase refrigerant that has passed through the exhaust-heat recovery circuit 30 or the bypass circuit 40 from the gas-liquid separator 17 joins with a gas-phase refrigerant having a medium pressure between the lower-stage compressor 311a and the higher-stage compressor 311b. Then, the refrigerator is compressed at high pressure by the higher-stage compressor 311b and flows into the heating heat exchanger 12.

According to the above-described embodiment, the junction 342 is located between the exhaust-heat recovery expansion valve 32 and the exhaust-heat recovery heat exchanger 31 in the exhaust-heat recovery circuit 30. Hence, gas-liquid two-phase refrigerant can be changed into gas-phase refrigerant via heat exchange in the exhaust-heat recovery heat exchanger 31. In other words, even if the gas-phase refrigerant changes to liquid-phase refrigerant in a process of passing through the bypass circuit 40, the liquid-phase refrigerant can be changed to the gas-phase refrigerant in the exhaust-heat recovery heat exchanger 31. That is, it is possible to prevent a liquid floodback phenomenon due to the refrigerant in the gas-liquid separator 17 being taken into the intermediate pressure port 11b in liquid phase.

The compressor 311 includes the lower-stage compressor 311a and the higher-stage compressor 311b. Thus, the exhaust-heat recovery circuit 30 and the bypass circuit 40 can be easily joined so as to return the refrigerant to the intermediate pressure part of the compressor 311 without connecting the circuits 30 and 40. That is, for gas injection in the compressor 311, it is possible to ensure a high degree of freedom in layout of refrigerant pipes connecting to the intermediate-pressure refrigerant pipe.

Fourth Embodiment

This embodiment is a modification based on the preceding embodiment. In this embodiment, a flow direction of refrigerant flowing through a main circuit 10 is reversed by using a four-way valve 471 in a heating operation and a cooling operation.

Figure 5:
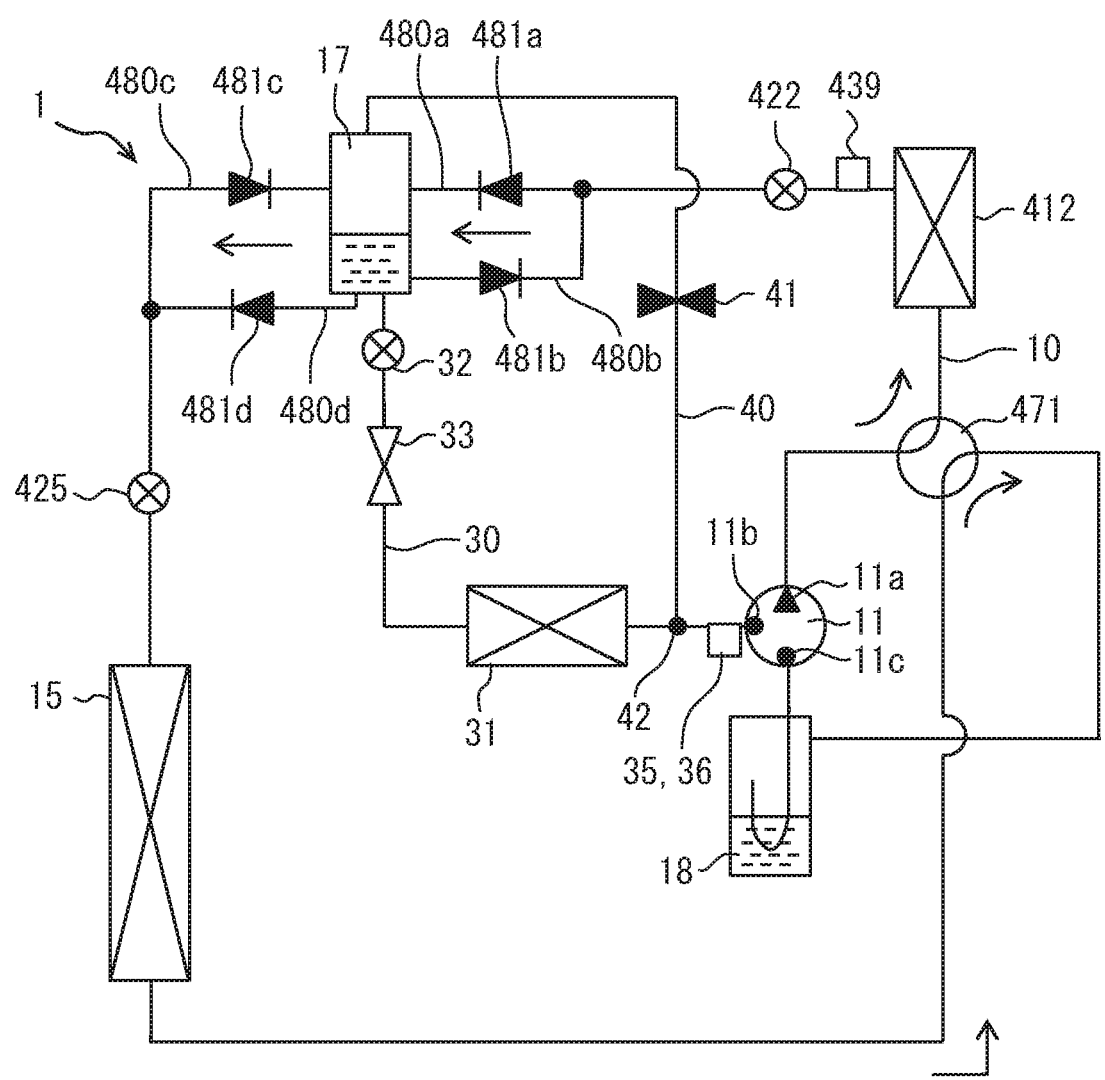
FIG. 5 is a diagram illustrating a configuration of a heat pump cycle in a heating operation, according to at least one embodiment.

In FIG. 5, the four-way valve 471 is connected to an outlet of a compressor 11, an inlet of an indoor heat exchanger 412, an outlet of an outdoor heat exchanger 15, and an inlet of an accumulator 18. The four-way valve 471 is a valve device that switches flow paths of the refrigerant. The four-way valve 471 is connected to the controller 50. The four-way valve 471 is a switching valve in which switching of the flow paths is controlled by the controller 50.

The indoor heat exchanger 412 is a heat exchanger that performs heat exchange between refrigerant flowing inside the indoor heat exchanger 421 and inside air. The indoor heat exchanger 412 heats the inside air during the heating operation of the heat pump cycle 1. On the other hand, the indoor heat exchanger 412 cools the inside air during the cooling operation of the heat pump cycle 1. The indoor heat exchanger 412 provides an example of a heat exchanger.

A gas-liquid separator 17 has an upper region in which gas-phase refrigerant is stored and a lower region in which liquid-phase refrigerant is stored. The main circuit 10 includes a refrigerant circuit connected to the upper region and a refrigerant circuit connected to the lower region on each of an upstream side and a downstream side of the gas-liquid separator 17. The refrigerant circuit located in the main circuit 10 close to the indoor heat exchanger 412 and connected to the upper region of the gas-liquid separator 17 is a first refrigerant pipe 480a. The refrigerant circuit located in the main circuit 10 close to the indoor heat exchanger 412 and connected to the lower region of the gas-liquid separator 17 is a second refrigerant pipe 480b. The refrigerant circuit located in the main circuit 10 close to the outdoor heat exchanger 15 and connected to the upper region of the gas-liquid separator 17 is a third refrigerant pipe 480c. The refrigerant circuit located in the main circuit 10 close to the outdoor heat exchanger 15 and connected to the lower region of the gas-liquid separator 17 is a fourth refrigerant pipe 480d.

The first refrigerant pipe 480a is provided with a first check valve 481a that shuts off refrigerant flowing in a direction from the gas-liquid separator 17 toward the indoor heat exchanger 412. The second refrigerant pipe 480b is provided with a second check valve 481b that shuts off refrigerant flowing in a direction from the indoor heat exchanger 412 toward the gas-liquid separator 17. The third refrigerant pipe 480c is provided with a third check valve 481c that shuts off refrigerant flowing in a direction from the gas-liquid separator 17 to the outdoor heat exchanger 15. The fourth refrigerant pipe 480d is provided with a fourth check valve 481d that shuts off the refrigerant flowing in a direction from the outdoor heat exchanger 15 to the gas-liquid separator 17.

A high pressure sensor 439 and an indoor expansion valve 422 are provided between the indoor heat exchanger 412 and the gas-liquid separator 17. An outdoor expansion valve 425 is provided between the gas-liquid separator 17 and the outdoor heat exchanger 15. The indoor expansion valve 422 and the outdoor expansion valve 425 are valve devices that can be switched between a fully open state, a throttled state in which a flow path is narrowed, and a fully closed state.

In the heating operation, the outlet of the compressor 11 communicate with a refrigerant pipe extending from the indoor heat exchanger 412 through the four-way valve 471. Further, a refrigerant pipe extending from the outdoor heat exchanger 15 communicates with the inlet of the accumulator 18 through the four-way valve 471. The indoor expansion valve 422 is slightly narrowed in opening degree from the fully opened state. That is, the indoor expansion valve 422 is narrowed in opening degree from the fully opened state in order to set a refrigerant pressure immediately after passing through the indoor heat exchanger 412 at a target high pressure. The outdoor expansion valve 425 is in a throttled state in which an opening degree thereof is narrowed such that the refrigerant is easily evaporated in the outdoor heat exchanger 15.

The flow of the refrigerant flowing in the main circuit 10 in the heating operation will be described below. The refrigerant discharged from the compressor 11 flows into the indoor heat exchanger 412 through the four-way valve 471. At this time, the high-temperature and high-pressure gas-phase refrigerant is condensed in the indoor heat exchanger 412 and gives heat to the inside air around the indoor heat exchanger 412 to be heated. Such heating enables the heat pump cycle 1 to heat an indoor space. The liquid-phase refrigerant passes through the indoor expansion valve 422 that is slightly narrowed in opening degree from the fully opened state. The refrigerant is slightly depressurized by the indoor expansion valve 422 and changes into gas-liquid two-phase refrigerant, and then the refrigerant passes through the first refrigerant pipe 480a and flows into the gas-liquid separator 17. Since the flow of the refrigerant is blocked by the second check valve 481b, the refrigerant cannot flow through the second refrigerant pipe 480b.

Gas-phase refrigerant of the decompressed gas-liquid two-phase refrigerant flowing into the gas-liquid separator 17 is extracted from its uppermost part and flows through the bypass circuit 40, and then returns to the compressor 11 as gas injection. As a result, the refrigerant stored in a lower region of the gas-liquid separator 17 decreases in vapor quality and specific enthalpy. That is, the refrigerant passes through the fourth refrigerant pipe 480d in a state capable of exerting a large refrigeration effect. Since the flow of the refrigerant is blocked by the third check valve 481c, the refrigerant cannot flow through the third refrigerant pipe 480c. The liquid-phase refrigerant that has decreased in specific enthalpy and flowed out of the gas-liquid separator 17 passes through the outdoor expansion valve 425 in the throttled state in which the refrigerant is reduced in pressure to be easily evaporated. Then, the liquid-phase refrigerant evaporates in the outdoor heat exchanger 15 by removing heat from outside air via heat exchange with the outside air. In the outdoor heat exchanger 15, an amount of heat absorbed from the outside air increases due to the gas injection effect.

The gas-phase refrigerant evaporated in the outdoor heat exchanger 15 passes through the four-way valve 471 and is guided to the accumulator 18. The gas-phase refrigerant is sucked from the accumulator 18 into the suction port 11c and is compressed again by the compressor 11. In the heating operation, the refrigerant repeats the above-described cycle, and a part of the refrigerant is gas-injected into the intermediate pressure port 11b without passing through the outdoor heat exchanger 15. This gas injection results in decrease in vapor quality of the refrigerant flowing through the outdoor heat exchanger 15 and improvement in heat exchange efficiency of the heat pump cycle 1 as a whole.

Figure 6:
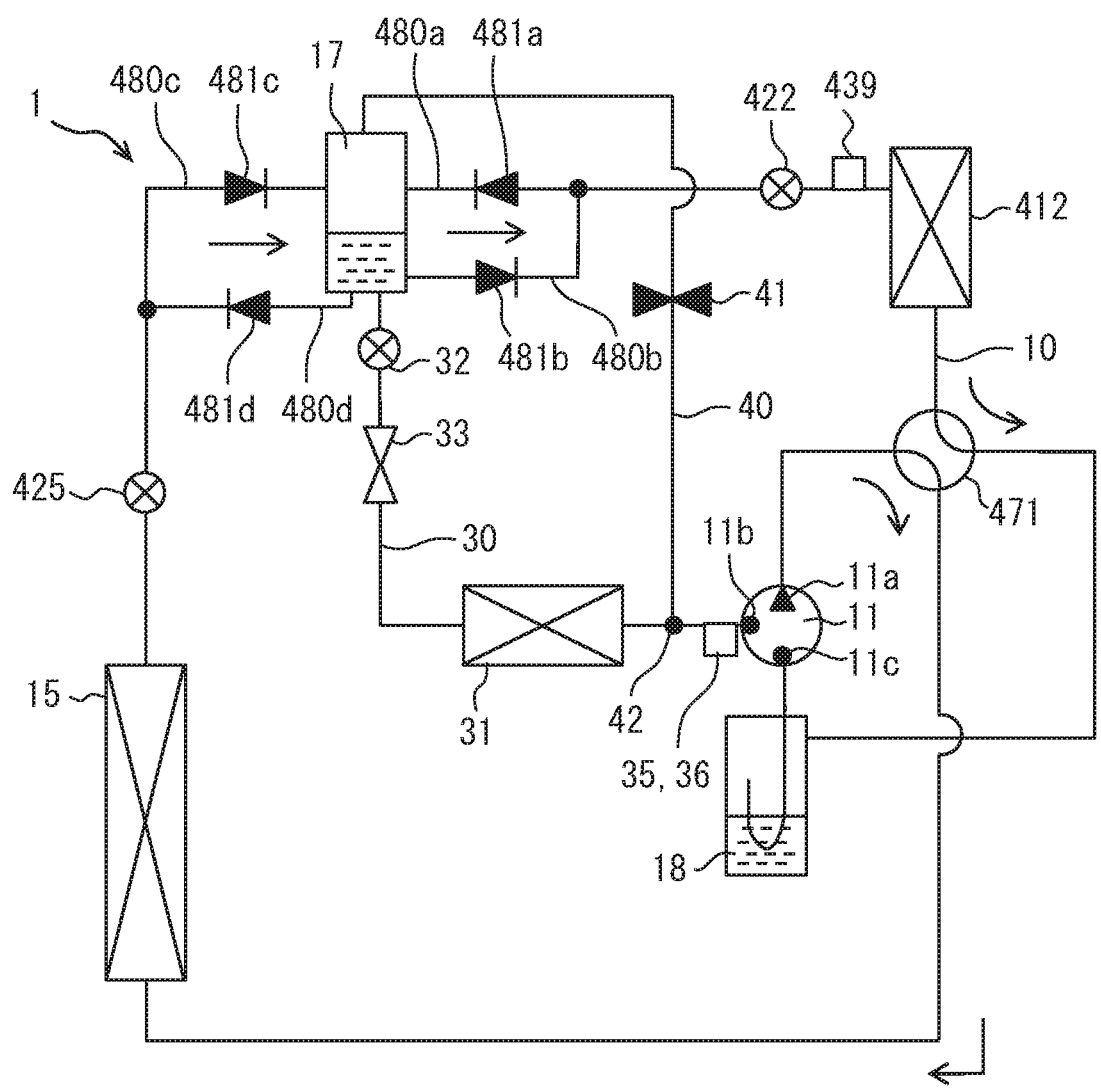
FIG. 6 is a diagram illustrating a configuration of the heat pump cycle in a cooling operation, according to at least one embodiment.

In the cooling operation of FIG. 6, the outlet of the compressor 11 communicate with the refrigerant pipe extending from the outdoor heat exchanger 15 through the four-way valve 471. Further, the refrigerant pipe extending from the indoor heat exchanger 412 communicates with the inlet of the accumulator 18 through the four-way valve 471. The indoor expansion valve 422 is in a throttled state. The outdoor expansion valve 425 is slightly narrowed in opening degree from the fully opened state.

The flow of the refrigerant flowing in the main circuit 10 in the cooling operation will be described below. The refrigerant discharged from the compressor 11 flows into the outdoor heat exchanger 15 through the four-way valve 471. At this time, the high-temperature and high-pressure gas-phase refrigerant is condensed in the outdoor heat exchanger 15 and releases heat to the outside air around the outdoor heat exchanger 15. The condensed liquid-phase refrigerant passes through the outdoor expansion valve 425 that is slightly narrowed in opening degree from the fully opened state. The refrigerant is slightly depressurized and changes into gas-liquid two-phase refrigerant, and then the refrigerant passes through the third refrigerant pipe 480c and flows into the gas-liquid separator 17. Gas-phase refrigerant of the gas-liquid two-phase refrigerant flowing into the gas-liquid separator 17 is extracted from its uppermost part and flows through the bypass circuit 40, and then returns to the compressor 11. According to this gas injection, the refrigerant stored in a lower region of the gas-liquid separator 17 decreases in vapor quality and specific enthalpy. In other words, the refrigerant accumulated in the lower region of the gas-liquid separator 17 changes into a refrigerant capable of exerting a greater refrigeration effect. Since the flow of the refrigerant is blocked by the fourth check valve 481*d*, the refrigerant cannot flow through the fourth refrigerant pipe 480*d*.

The liquid-phase refrigerant that has decreased in specific enthalpy in the gas-liquid separator 17 passes through the second refrigerant pipe 480*b*. Since the flow of the refrigerant is blocked by the first check valve 481*a*, the refrigerant cannot flow through the first refrigerant pipe 480*a*. The liquid-phase refrigerant flowed out of the gas-liquid separator 17 passes through the indoor expansion valve 422 in the throttled state in which the refrigerant is reduced in pressure to be easily evaporated. Then, the liquid-phase refrigerant evaporates in the indoor heat exchanger 412 by removing heat from inside air via heat exchange with the inside air for air conditioning. In the indoor heat exchanger 412, an amount of heat absorbed from the outside air increases due to the gas injection effect. Such cooling enables the heat pump cycle 1 to cool the indoor space.

The gas-phase refrigerant evaporated in the indoor heat exchanger 412 passes through the four-way valve 471 and is guided to the accumulator 18. The gas-phase refrigerant is sucked from the accumulator 18 into the suction port 11*c* and is compressed by the compressor 11. In the cooling operation, the refrigerant repeats the above-described cycle, and a part of the refrigerant is gas-injected into the intermediate pressure port 11*b* without passing through the indoor heat exchanger 412. This gas injection results in decrease in vapor quality of the refrigerant flowing through the indoor heat exchanger 412 and improvement in heat exchange efficiency of the heat pump cycle 1 as a whole.

According to the above-described embodiment, the four-way valve 471 is controlled so as to switch the flow direction of the refrigerant flowing through the main circuit 10 between the heating operation and the cooling operation. Therefore, the heating operation or the cooling operation can be performed using one indoor heat exchanger 412 as a heating device or a cooling device. That is, the size of the heat pump cycle 1 can be reduced as compared with a case where two heat exchangers: a heat exchanger dedicated to the cooling operation and a heat exchanger dedicated to the heating operation, are used.

Fifth Embodiment

This embodiment is a modification based on the preceding embodiment. In this embodiment, a mechanical expansion valve is used as an exhaust-heat recovery expansion valve 532. Further, a main compressor 511*a* and an exhaust-heat recovery compressor 511*b* are provided.

Figure 7:
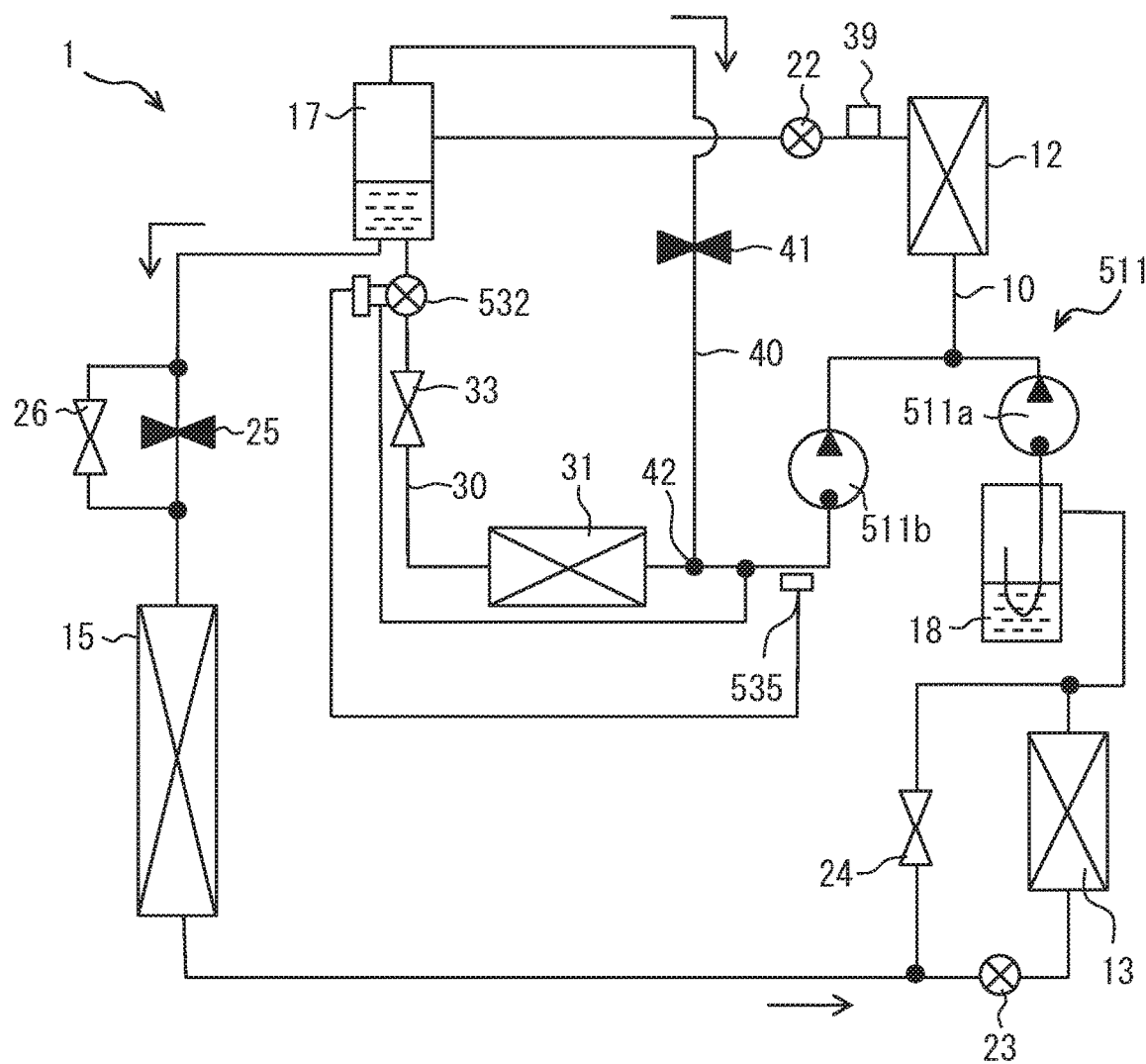
FIG. 7 is a diagram illustrating a configuration of a heat pump cycle according to at least one embodiment.

In FIG. 7, an exhaust-heat recovery circuit 30 includes the exhaust-heat recovery expansion valve 532. The exhaust-heat recovery expansion valve 532 is a mechanical valve device using a diaphragm that is a pressure-sensitive member. The diaphragm partitions an inner space into two spaces, a first space and a second space. The first space encloses a medium which changes in pressure according to temperature. The first space communicates with a temperature-sensitive cylinder 535 that is in contact with a refrigerant pipe on a downstream side of an exhaust-heat recovery heat exchanger 31. That is, temperature of refrigerant flowing out of the exhaust-heat recovery heat exchanger 31 is transmitted to the medium inside the first space. Therefore, according to the temperature of the refrigerant flowing out of the exhaust-heat recovery heat exchanger 31, a volume of the medium changes, and the pressure inside the first space changes. The second space communicates with the refrigerant pipe on the downstream side of an exhaust-heat recovery heat exchanger 31. Therefore, according to pressure of the refrigerant flowing out of the exhaust-heat recovery heat exchanger 31, the pressure inside the second space changes.

The diaphragm is connected to a valve rod that drives a valve element of the exhaust-heat recovery expansion valve 532. Therefore, a degree of throttling of the exhaust-heat recovery expansion valve 532 is automatically adjusted according to a differential pressure between an evaporation pressure in the exhaust-heat recovery heat exchanger 31 and a pressure corresponding to the temperature of the refrigerant at the outlet of the exhaust-heat recovery heat exchanger 31. In other words, the degree of throttling of the exhaust-heat recovery expansion valve 532 is automatically adjusted based on the pressure difference between the first space and the second space of the diaphragm. That is, the exhaust-heat recovery expansion valve 532 is a mechanical expansion valve that mechanically adjusts a valve opening degree by using a volume change of the medium. The exhaust-heat recovery expansion valve 532 provides an expansion valve.

The compressor 511 includes the main compressor 511*a* and the exhaust-heat recovery compressor 511*b*. The main compressor 511*a* is a compressor that sucks and compresses refrigerant that has passed through an outdoor heat exchanger 15. In other words, the main compressor 511*a* is a compression device that circulates the refrigerant through the main circuit 10. The exhaust-heat recovery compressor 511*b* is a compression device that sucks and compresses refrigerant that has passed through the exhaust-heat recovery circuit 30 and refrigerant that has passed through the bypass circuit 40. In other words, the exhaust-heat recovery compressor 511*b* is a compressor that circulates refrigerant through the exhaust-heat recovery circuit 30 and the bypass circuit 40.

When the heat pump cycle 1 is operated, the main compressor 511*a* and the exhaust-heat recovery compressor 511*b* are independently controlled. That is, the output power of the main compressor 511*a* is adjusted according to the load of the air-conditioning operation while the exhaust-heat recovery compressor 511*b* is set to a high-power operation during the heating operation, and the exhaust-heat recovery compressor 511*b* is set to a low-power operation during the cooling operation. Accordingly, an amount of the refrigerant flowing through the heating heat exchanger 12 and an amount of the refrigerant flowing through the cooling heat exchanger 13 are controlled. That is, when the exhaust-heat recovery compressor 511*b* is set to the high-power operation, a circulation amount of refrigerant without passing through the cooling heat exchanger 13 is increased, and a heating capacity is improved. On the other hand, when the exhaust-heat recovery compressor 511*b* is set to the low-power operation, the circulation amount of refrigerant passing through the cooling heat exchanger 13 is increased, and a cooling capacity is improved.

When a large amount of exhaust heat is discharged from the heat source, a running rate of the exhaust-heat recovery compressor 511*b* is increased by, for example, lengthening an operation time in order to recover the large amount of exhaust heat from the heat source. On the other hand, when the exhaust heat discharged from the heat source is small, the operation rate is reduced by, for example, shortening the operation time of the exhaust-heat recovery compressor 511*b*.

During the heating operation, the exhaust-heat recovery compressor 511*b* may be driven while the main compressor 511*a* is stopped, so that the refrigerant circulates only through a circuit that does not pass through the outdoor heat exchanger 15 or the like. In this case, since the refrigerant can be circulated through a short path without passing through the outdoor heat exchanger 15 or the like, the pressure loss generated in the refrigerant circulation can be reduced. This operation is particularly effective when an amount of heat obtained from the outside air in the outdoor heat exchanger 15 is small, such as when the outside air temperature is extremely low. It is particularly effective when the heat exchange efficiency of the outdoor heat exchanger 15 is reduced due to, for example, frost formation on the outdoor heat exchanger 15. In this case, a time period during which the refrigerant does not flow through the outdoor heat exchanger 15 can be secured, frost on the outdoor heat exchanger 15 can be melted by heat of the outside air. Thereby, the decrease in heat exchange efficiency of the outdoor heat exchanger 15 is eliminated.

In the above-described embodiment, the mechanical expansion valve is used as the exhaust-heat recovery expansion valve 532. In other words, the exhaust-heat recovery expansion valve 532 adjusts the valve opening degree without a control signal from outside. Therefore, it is not necessary for the controller 50 to control pressure reduction of the refrigerant flowing into the exhaust-heat recovery heat exchanger 31. That is, the exhaust-heat recovery expansion valve 532 can be automatically set to an appropriate degree of throttling based on the temperature and pressure of the refrigerant on the downstream side of the exhaust-heat recovery heat exchanger 31. Therefore, a control target of the controller 50 can be omitted, and the control content can be simplified. Further, a signal line for transmitting and receiving the control signal can be omitted.

The compressor 511 includes the exhaust-heat recovery compressor 511b, in addition to the main compressor 511a that circulates the refrigerant in the main circuit 10 through the outdoor heat exchanger 15. Therefore, the exhaust-heat recovery compressor 511b that circulates the refrigerant through the exhaust-heat recovery circuit 30 and the bypass circuit 40 can be controlled independently from the main compressor 511a. Therefore, it is easy to control the compressor 511 to meet the optimum conditions according to differences of the air conditioning conditions such as the air conditioning modes.

The disclosure in this specification is not limited to the illustrated embodiment. The disclosure encompasses the illustrated embodiments and variations based on the embodiments by those skilled in the art. For example, the present disclosure is not limited to the combinations of components and/or elements shown in the embodiments. The present disclosure may be implemented in various combinations. The present disclosure may have additional portions which may be added to the embodiments. The disclosure encompasses omission of components and/or elements of the embodiments. The disclosure encompasses the replacement or combination of components and/or elements between one embodiment and another.

While the present disclosure has been described with reference to examples, it is understood that the present disclosure is not limited to the disclosed examples and structures described above. Rather, the present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. A heat pump cycle comprising:
a compressor that compresses refrigerant;
a heat exchanger that exchanges heat between the refrigerant discharged from the compressor and indoor air;
a gas-liquid separator that separates the refrigerant flowing out of the heat exchanger into gas phase and liquid phase;
an outdoor heat exchanger that performs heat exchange between the refrigerant flowing out of the gas-liquid separator and outdoor air;
a main circuit forming a flow path allowing the refrigerant to flow therethrough and connecting the compressor, the heat exchanger, the gas-liquid separator, and the outdoor heat exchanger;
an exhaust-heat recovery heat exchanger that performs heat exchange between a heat source that releases heat and the refrigerant in liquid phase separated by the gas-liquid separator;
an exhaust-heat recovery circuit forming a flow path in which the refrigerant in liquid phase flowing out of the gas-liquid separator flows to the compressor not through the outdoor heat exchanger but through the exhaust-heat recovery heat exchanger;
an expansion valve that is disposed upstream of the exhaust-heat recovery heat exchanger in the exhaust-heat recovery circuit and expands the refrigerant such that the refrigerant changes from liquid phase to gas phase in the exhaust-heat recovery heat exchanger;
an exhaust-heat recovery open-close valve that is disposed in the exhaust-heat recovery circuit and allows or blocks flow of the refrigerant in liquid phase in the exhaust-heat recovery circuit;
a bypass circuit forming a flow path in which the refrigerant is gas phase flowing out of the gas-liquid separator flows to the compressor;
a bypass decompression valve that is disposed in the bypass circuit and decompresses the refrigerant passing through the bypass circuit;
a sensor that is disposed in the exhaust-heat recovery circuit between the exhaust-heat recovery heat exchanger and the compressor and detects a temperature of the refrigerant; and
a controller that controls an opening degree of the expansion valve based on a detection result of the sensor, wherein
the controller controls the opening degree of the expansion value and an opening degree of the bypass decompression valve such that an amount of the refrigerant flowing in the exhaust-heat recovery circuit increases in accordance with increase in temperature of the refrigerant detected by the sensor.

2. The heat pump cycle according to claim 1, comprising:
a junction where the bypass circuit and the exhaust-heat recovery circuit are joined, wherein
the junction is located downstream of the exhaust-heat recovery heat exchanger in the exhaust-heat recovery circuit.

3. The heat pump cycle according to claim 1, comprising:
a junction where the bypass circuit and the exhaust-heat recovery circuit are joined, wherein
the junction is located between the expansion valve and the exhaust-heat recovery heat exchanger in the exhaust-heat recovery circuit.

4. The heat pump cycle according to claim 1, comprising:
a liquid level sensor that detects a liquid level in the gas-liquid separator, wherein the bypass decompression valve decreases in valve opening degree to reduce an amount of the refrigerant flowing through the bypass circuit in accordance with rise in liquid level detected by the liquid level sensor, and increases in valve opening degree to increase the amount of refrigerant flowing through the bypass circuit in accordance with fall in liquid level.

5. The heat pump cycle according to claim 1, wherein the compressor is a two-stage compressor, and
the exhaust-heat recovery circuit is connected to an intermediate pressure port of the two-stage compressor.

6. The heat pump cycle according to claim 1, wherein the compressor includes a lower-stage compressor and a higher-stage compressor, and
the exhaust-heat recovery circuit is connected to a refrigerant pipe connecting the lower-stage compressor and the higher-stage compressor.

7. The heat pump cycle according to claim 1, wherein the compressor includes:
a main compressor that circulates the refrigerant in the main circuit; and
an exhaust-heat recovery compressor that circulates the refrigerant in the exhaust-heat recovery circuit.

8. The heat pump cycle according to claim 1, wherein the compressor is a single-stage compressor, and
the exhaust-heat recovery circuit allows the refrigerant flowing therethrough to be sucked into the single-stage compressor from a suction port of the single-stage compressor.

9. The heat pump cycle according to claim 1, wherein the expansion valve is a mechanical expansion valve in which its valve opening degree is adjusted without an external control signal.

10. The heat pump cycle according to claim 1, comprising a four-way valve that changes a flow direction of the refrigerant flowing in the main circuit depending on whether a heating operation or a cooling operation is performed.

* * * * *